United States Patent [19]
Lewis

[11] Patent Number: 5,220,742
[45] Date of Patent: Jun. 22, 1993

[54] ROD-MOUNTED PROTECTIVE CASE FOR FISHING LURES AND HOOKS

[76] Inventor: Kenneth D. Lewis, 439 S. 200 West, #16, Provo, Utah 84601

[21] Appl. No.: 879,868

[22] Filed: May 6, 1992

[51] Int. Cl.$^5$ .............................................. A01K 87/00
[52] U.S. Cl. .................................. 43/25.2; 206/315.11
[58] Field of Search ................ 43/25.2, 25, 57.1, 57.2; 206/315.11; D22/149, 199

[56] References Cited

U.S. PATENT DOCUMENTS

| | | | |
|---|---|---|---|
| D. 217,663 | 5/1970 | Chamberlain | 43/25.2 |
| 2,478,621 | 8/1949 | Attula | 206/315.11 |
| 2,767,502 | 10/1956 | Reynolds | 43/25.2 |
| 2,783,875 | 3/1957 | Shabarick | 206/315.11 |
| 4,036,451 | 7/1977 | Pipkin | 206/389 |
| 4,681,220 | 7/1987 | Beneke | 43/25.2 |
| 4,780,983 | 11/1988 | Smith | 43/57.1 |
| 4,862,635 | 9/1989 | Conte | 43/57.1 |
| 5,056,256 | 10/1991 | Traux | 43/25.2 |

FOREIGN PATENT DOCUMENTS 144620  3/1954  Sweden ................................ 43/25.2

Primary Examiner—Mark Rosenbaum
Assistant Examiner—Jeanne M. Elpel
Attorney, Agent, or Firm—Workman, Nydegger and Jensen

[57] ABSTRACT

A protective case for fishing hooks and lures wherein the protective case is mounted to a fishing rod. The protective case has an outer housing and an inner housing capable of rotation therebetween to open and occlude access ports through which a fishing lure may be inserted. An opening formed in the end of both outer housing member 12 and inner housing member 32 provides for continuous engagement with a fishing line. An aperture cap provides a bottom for the enclosure, which may be removed to clean debris that has accumulated therein. The protective case may be attached to a fishing rod through any of a variety of methods including a V-shaped clamping member, hook and pile straps or a spring clamp.

9 Claims, 7 Drawing Sheets

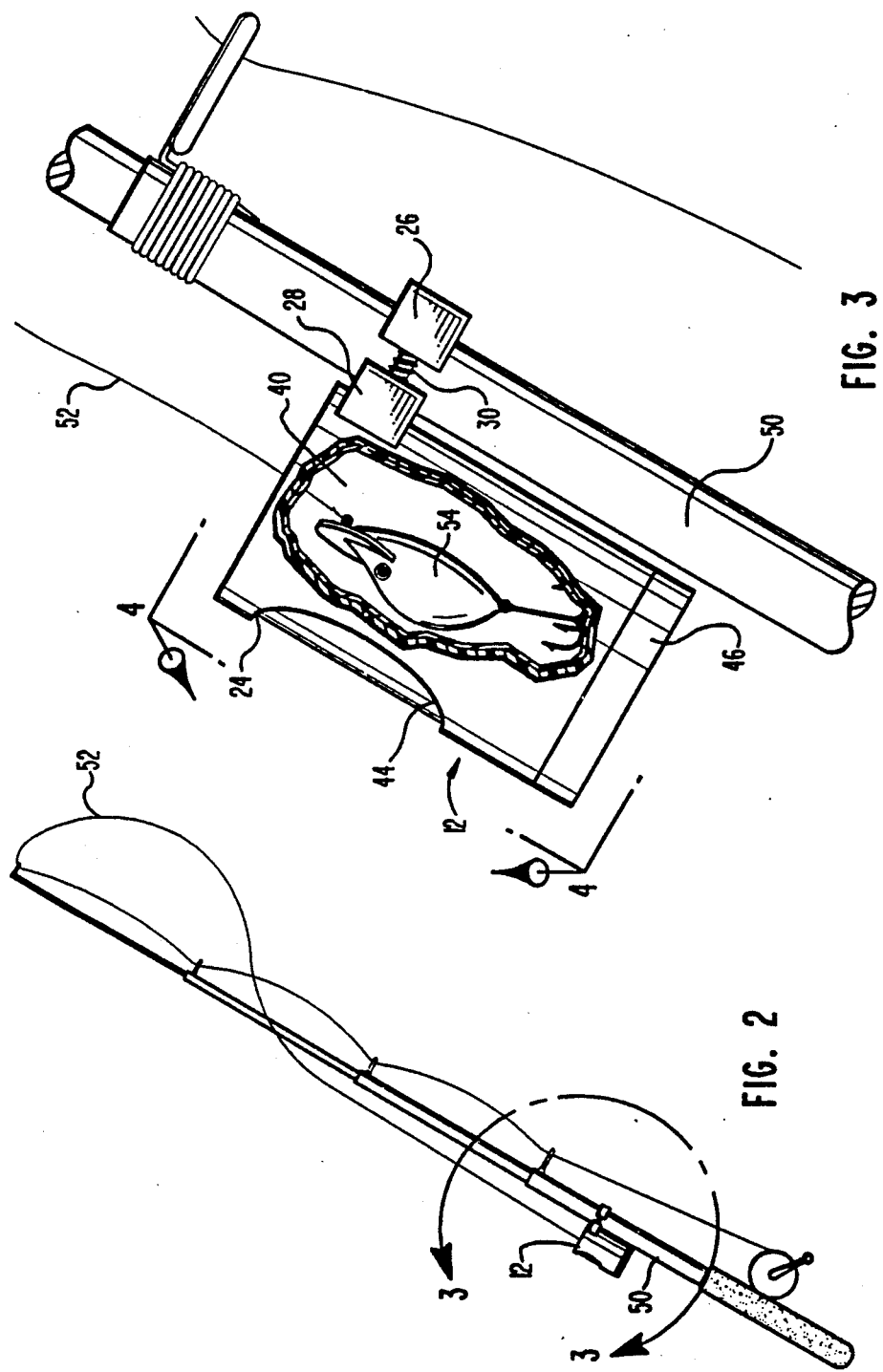

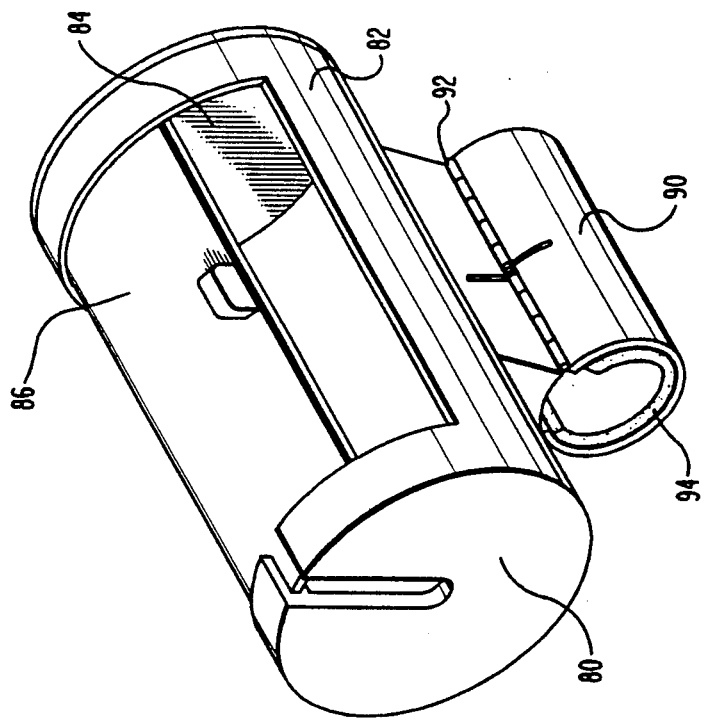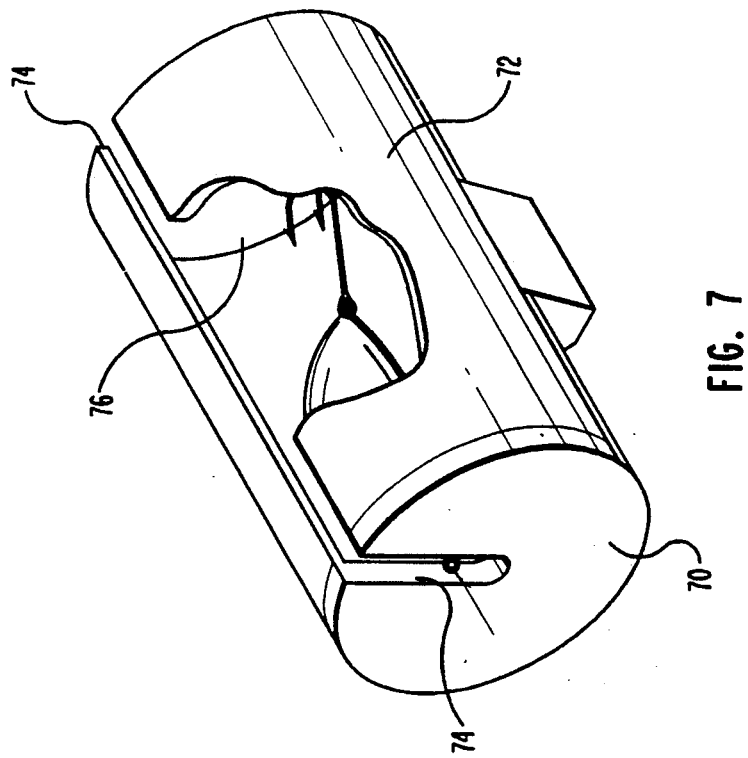

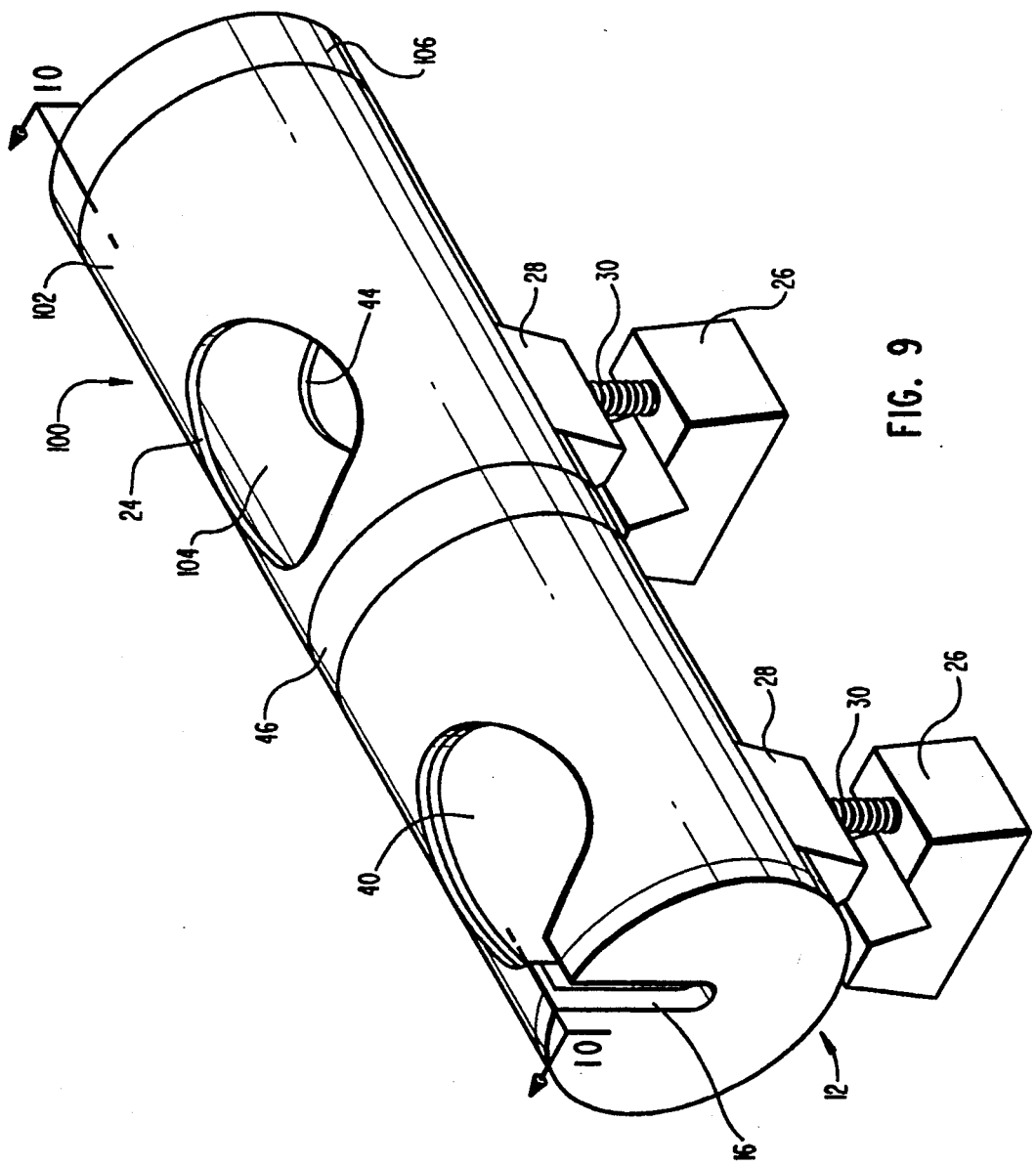

ROD-MOUNTED PROTECTIVE CASE FOR FISHING LURES AND HOOKS

BACKGROUND

1. Field of the Invention

This invention relates to enclosures capable of protecting fishing hooks and lures from becoming inadvertently snagged during transport to a fishing site. More particularly, this invention relates to a fishing rod-mounted case capable of protecting the fishing hook or lure from inadvertent snagging during transport while simultaneously allowing the fishing hook or lure to remain attached to a fishing line.

2. Background Art

Many approaches have been used to effect the secure protection of fishing lures or hooks from inadvertent snagging during transport to the fishing site. One approach has involved the use of a tackle box in which is placed trays capable of holding a quantity of fishing lures and hooks. Typically, the tackle box has a handle by which a user may carry the tackle box to a stream or lake where the user would like to fish. The disadvantage of this system, however, is that the fishing lure may not be maintained in an attached state to the fishing line while in the tackle box.

To overcome this disadvantage many fisherman have resorted to attaching a fishing lure to a fishing line and then attaching the fishing lure to the fishing rod directly either to one of the ferrules or to some other attachment point on the fishing rod. The well-known problem encountered with this technique, however, is that many fishing lures utilize treble hooks and attachment of one hook to the fishing rod exposes the two remaining hooks to inadvertent snagging on upholstery, passing branches, or the person transporting the fishing equipment.

To protect themselves from exposed hooks, some individuals have resorted to wrapping exposed hooks in aluminum foil or cardboard to sheath the exposed hooks. While such wrapping often prevents puncture from the exposed hooks for a period of time, the sheathing material eventually becomes perforated by the sharp tip of the hook and is re-exposed to potential snagging upon objects in the surrounding environment.

A further drawback to such techniques is that upon reaching the fishing site, these sheaths must be removed from the sharp barbs of the tremble hook before the lure may be used. It is often during the removal of these crude sheaths that injury is incurred.

OBJECTS AND BRIEF SUMMARY OF THE INVENTION

Accordingly, it is one object of the present invention to provide a rod mounted protective case capable of retaining a fishing lure or hook attached to a fishing line dispensed from a reel mounted on a fishing rod.

Another object of the present invention is to provide a protective case which is light-weight and easily attached to a fishing rod.

A further object of the present invention is to provide a protective case with an opening through which a fishing lure may be easily inserted, such opening capable of being closed to prevent inadvertent snagging.

A still further object of the present invention is to provide a protective case capable of being accessed so that said enclosure may be periodically cleaned.

Yet another object of the present invention is to provide a protective case that is water resistent and durable.

Another object of the present invention is to provide a protective case capable of receiving fishing lures of a variety of sizes.

Still another object of the present invention is to provide a protective case capable of being mounted on fishing rods having a wide variety of diameters.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a rod-mounted protective case for fishing lures and hooks is provided. The protective case is comprised of an outer housing and an inner housing.

The outer housing has formed therein a receiving chamber partially enclosed by an outer housing end and an outer housing sidewall. The outer housing sidewall has an opening formed therein capable of receiving a fishing line therethrough. The outer housing sidewall is contiguous with the partially closed outer housing end and extends from the partially closed outer housing end to a point wherein the receiving chamber formed therein between is of sufficient volumetric capacity to contain a fishing hook.

An outer housing access port is formed in the outer housing sidewall which is capable of receiving a fishing hook or lure. A receiving orifice is formed within the sidewall at the end opposite the partially closed outer housing end.

Within the outer housing is an inner housing which is capable of being inserted and removed through the receiving orifice in the end of the outer housing. The inner housing is comprised of a structure very similar to the outer housing but is constructed on a slightly smaller scale so as to be capable of being inserted within the outer housing.

The inner housing has formed therein a holding chamber. The inner housing has a partially closed end capable of receiving a fishing line therethrough. A sidewall contiguous with the partially closed end extends from the partially closed end to a point wherein the holding chamber formed therebetween is of sufficient volumetric capacity to contain a fishing hook or lure. An inner access port is formed in the sidewall capable of receiving a fishing hook or lure.

An inner housing access aperture is formed within the end of the inner housing opposite the partially closed end, the aperture being capable of closure by with an aperture cap. The aperture cap is removable so that a user may periodically clean the holding chamber of any debris which has accumulated therein.

The protective case is mounted to the rod through any of a variety of methods including a V-shaped bracket, a sprung hinge, hook and pile fasteners, and various adhesives.

In use, the fishing lure is inserted into the outer and inner housing access ports which are at this point aligned. Alignment of both access ports also assures alignment of the openings within the partially closed ends of both the inner and outer chamber so that a fishing line may pass therethrough. After insertion of a fishing hook through the inner and outer housing access ports, the inner housing may be rotated within the outer housing so that the access ports are no longer aligned. This rotation occludes the outer access port with the inner housing side wall. The hook is now totally enclosed within the protective casing, with the exception of a small hole formed within the partially closed end through which fishing line may exit.

The present invention also anticipates a second inner housing being linearly attached to the aperture end of the first outer housing. A second outer housing is then placed over the second inner housing. The purpose of the second inner and outer housing is to afford the user the opportunity to store a second fishing lure which is not attached to the fishing line. Although the presently preferred embodiment of the protective case is formed of plastic, other materials are anticipated such as corrosion resistant metals or other corrosion resistant materials.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIG. 2 is a perspective view of the protective case illustrated in FIG. 1 mounted to a fishing rod; FIG. 3 is a partially cut-away view of the protective case illustrated in FIG. 2;

FIG. 7 illustrates an alternate embodiment of the present invention;

FIG. 8 illustrates an alternate embodiment of the present invention utilizing a sliding door;

FIG. 9 illustrates an embodiment of the present invention utilizing a second protective case to hold additional hooks or lures.

DETAILED DESCRIPTION OF THE PREFERRED EMBODIMENTS

Figure 1:
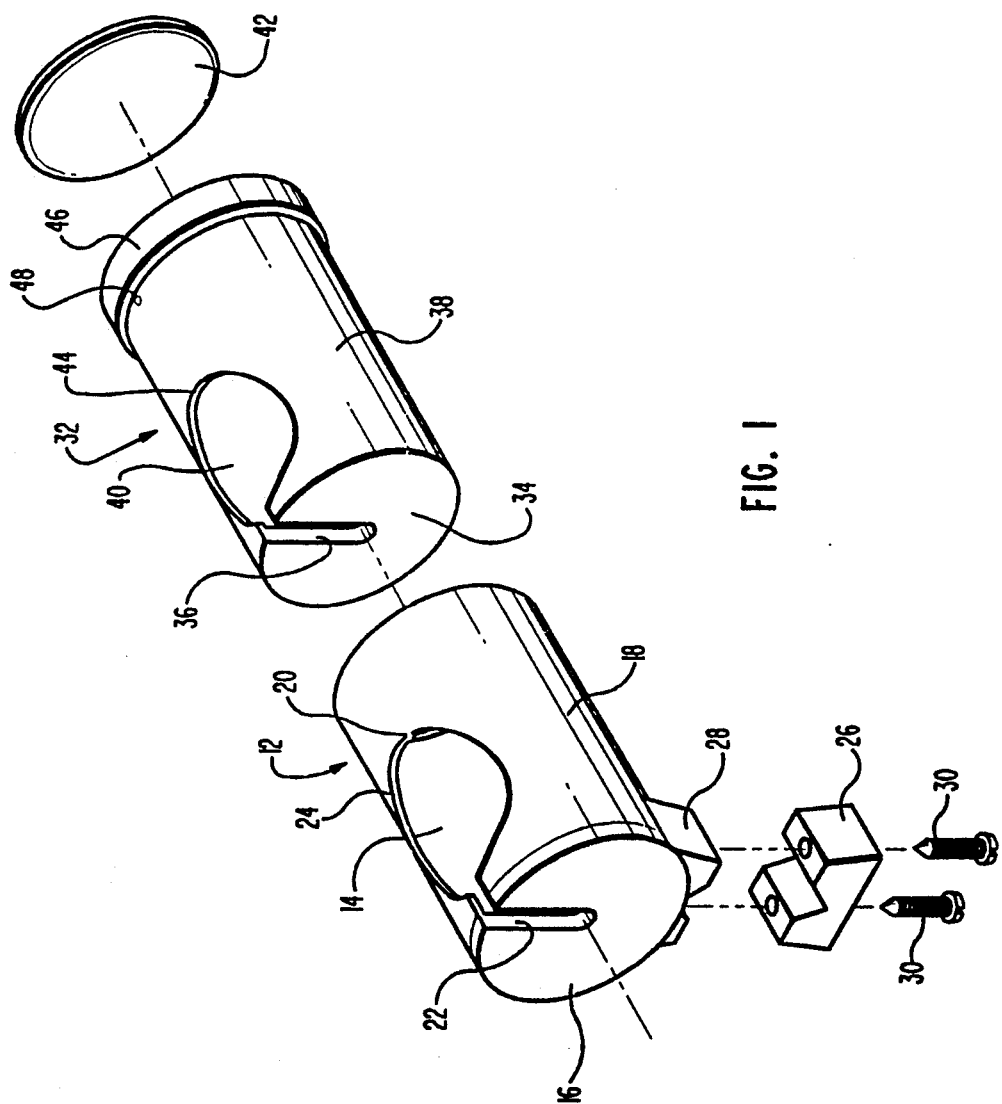
FIG. 1 is an exploded view of one embodiment of the protective case.

FIG. 1 illustrates a protective case having an outer housing 12 having formed therein a receiving chamber 14. Outer housing 12 is comprised of a partially closed outer housing end 16, an outer housing sidewall 18, and a receiving orifice 20 bounded by the outer housing sidewall 18. Outer housing end 16 has formed therein a fishing line opening 22 for passage of a fishing line therethrough. Formed within outer housing sidewall 18 is an outer housing access port 24 through which a fishing lure or fishing hook may be passed.

According to one aspect of the present invention, a protective case such as the protective case illustrated in FIG. 1 is provided with means for attaching the protective case to fishing equipment.

By way of example and not limitation, the attachment means in the preferred embodiment illustrated in FIG. 1 comprise a V-shaped clamping member 26 and a V-shaped appendage 28 attached to outer housing 12. Screws 30 are inserted through V-shaped clamping member 26 around a fishing rod and into V-shaped appendage 28 to secure outer housing 12 to a fishing rod.

Inserted through receiving orifice 20 is inner housing 32. Inner housing 32 is composed of a partially closed inner housing end 34 having an inner housing fishing line opening 36 formed therein. An inner housing sidewall 38 encircles a portion of a receiving chamber 40. Receiving chamber 40 is partially enclosed by inner housing sidewall 38 and inner housing end 34. An inner housing access aperture is formed in the end opposite inner housing end 34. The inner housing access aperture is capable of being occluded by an access aperture cap 42. An inner housing access port 44 is formed within inner housing sidewall 38 to allow access to allow a fishing lure to be passed therethrough. A grip ring 46 encircles the end of inner housing sidewall 38 opposite inner housing end 34. Grip ring 46 allows inner housing 32 to be rotated within outer housing 12, thereby occluding inner housing access port 24 when desired. A detent 48 engages outer housing 12 to selectively interlock inner housing 32 with outer housing 12 while nevertheless allowing rotation therebetween.

In use, outer housing 12 is attached to a fishing rod by using any one of the means for attaching the protective case to the fishing rod, such as V-shaped clamping member 26 and V-shaped appendage 28. Inner housing 32 is slid into outer housing 12 until detent 48 engages outer housing 12. In normal usage aperture cap 42 is locked into the end of inner housing 32, but may be removed for cleaning holding chamber 40 formed therein. When outer housing access port 24 and inner housing access port 44 are aligned, a fishing lure may be inserted through both apertures into holding chamber 40. Rotation of inner housing 32 within outer housing 12 then occludes outer housing access port 24, thereby totally enclosing a fishing lure therein. Rotation of inner housing 32 within outer housing 12 does not, however, occlude fishing line opening 22 or inner housing fishing line opening 36. As both fishing line openings share a common, central axis, a circular opening having a diameter approximately the same as the width of the fishing line openings is formed. This circular opening allows fishing line to pass therethrough even when outer access port 24 is occluded by sidewall 38 of inner housing 32.

FIG. 2 illustrates the positioning of outer housing 12 on a fishing rod 50. Outer housing 12 may be located anywhere on fishing rod 50, however it is found to operate most effectively when placed closest to the user. As can be seen in FIG. 2, a fishing hook or lure may remain attached to fishing line 52 while simultaneously being enclosed within outer housing 12.

While the presently preferred embodiment of the protective case is shown attached to the fishing rod, it will be appreciated that the protective case may also be attached to the fishing reel and continue to fall within the scope of the present invention.

FIG. 3 illustrates the protective case depicted in FIG. 2 in a cut-away manner so that a lure 54 may be illustrated enclosed within the protective case. As can be seen in FIG. 3, lure 54 remains attached to fishing line 52 while enclosed within the protective case. When fishing lure 54 is wished to be removed, a user simply rotates grip ring 46 until inner housing access port 44 is aligned with outer housing access port 24 whereupon fishing line opening 22 and inner fishing line opening 36 form a slot-shaped opening. Fishing lure 54 may then be accessed through outer housing access port 24 and removed for use.

Figure 4A:
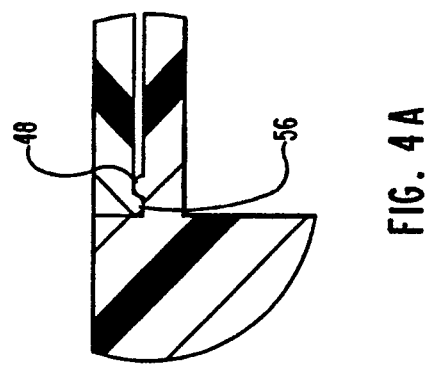
FIG. 4a is an enlarged detailed view of a portion of the protective case shown in FIG. 4.
Figure 4:
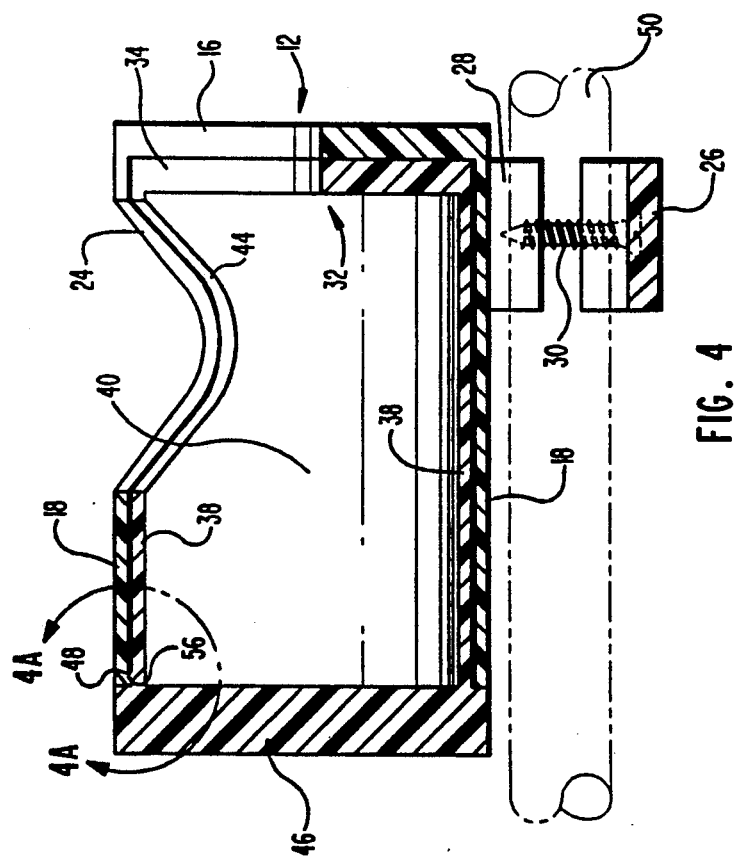
FIG. 4 is a cross-sectional longitudinal view illustrating the interaction between the inner and outer housings of the protective casing illustrated in FIG. 3.

FIG. 4 illustrates a longitudinal cross-section of a protective case depicting in more detail the interaction of inner housing 32 with outer housing 12. Inner housing 32 fits snugly within outer housing 12 while still allowing rotation through the use of grip ring 46. Inner housing 32 can be selectively locked within outer housing 12 by locking detent 48 over a retention ridge 56 formed in outer housing 12.

FIG. 4a depicts in more detail the interlocking engagement between detent 48 and retention ridge 56. While inner housing 32 may be prevented from being removed from outer housing 12 in a linear direction by the interaction of detent 48 and retention ridge 56, rotational movement between outer housing 12 and inner housing 32 is not prevented. During rotation, detent 48 merely rides along retention ridge 56 to provide free rotational movement therebetween.

Figure 5:
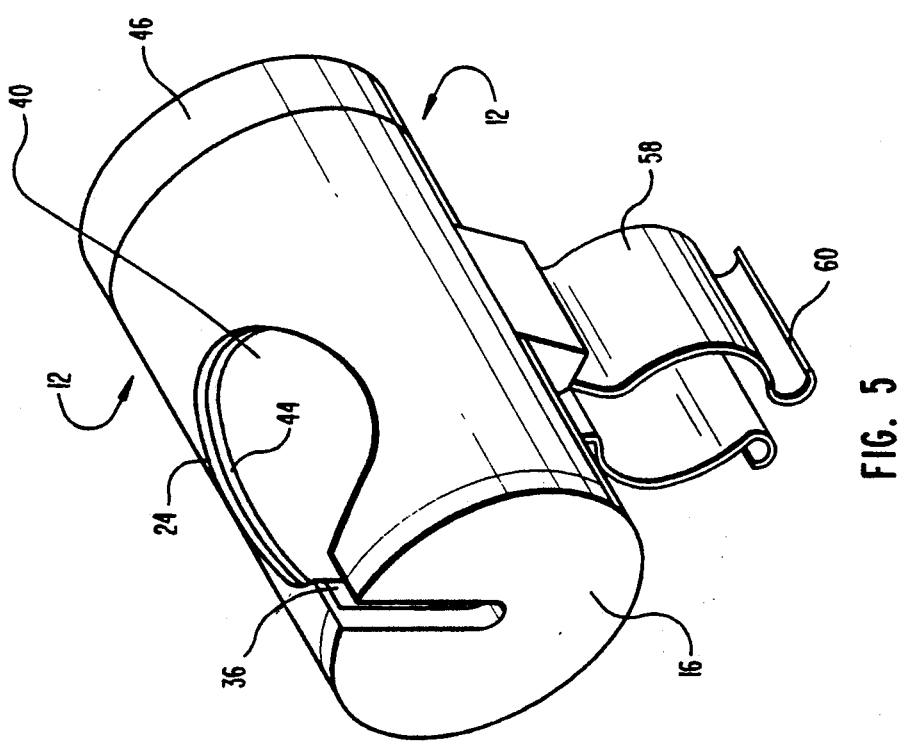
FIG. 5 illustrates a protective case such as that illustrated in FIG. 4 depicting an alternate attachment to the fishing rod.

FIG. 5 depicts a protective case like that illustrated in FIG. 4 in the orientation in which a fishing lure may be deposited within holding chamber 40.

According to one aspect of the present invention a protective case like that illustrated in FIG. 5 is provided with means for attaching the protective case to fishing equipment.

By way of example and not limitation, the attachment means in the embodiment illustrated in FIG. 5 comprise a spring clamp 58 attached to outer housing 12. The protective case is attached to a fishing rod by pressing spring clamp 58 toward the fishing rod thereby expanding clamp ends 60 and spreading them apart around the fishing rod. The compressive force exerted by spring clamp 58 is sufficient to retain the protective case on the fishing rod during use.

Figure 6:
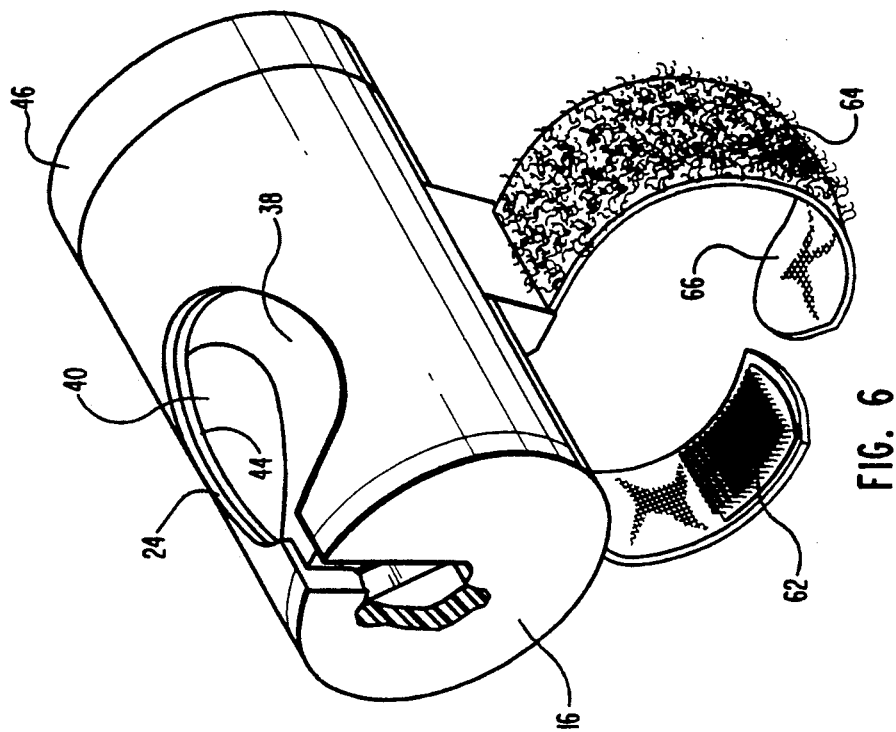
FIG. 6 illustrates a protective case like that shown in FIG. 5, illustrating another attachment to a fishing rod.

FIG. 6 illustrates a protective case like that illustrated in FIG. 5, depicting yet another embodiment of the means for attaching the protective case to fishing equipment. By way of example and not limitation the attachment means of the protective case illustrated in FIG. 6 comprise hook strap 62 and pile strap 64. Pile strap 64 is wrapped around a fishing rod whereupon hook strap 62 is engaged into pile strap 64 to form a locking interaction therebetween. Pile strap 64 has adhered to its inner surface 66 a rubber-based coating capable of gripping the fiberglass materials of which the majority of fishing rods of composed. Other non-slip coatings are also anticipated for adhesion to pile strap 64.

FIG. 7 illustrates an alternate embodiment of the protective case having an end cap 70, sidewall 72, and fishing line opening 74. In this embodiment, fishing line opening 74 extends from end cap 70 through sidewall 72 to an aperture 76 by sidewall 72 in the end opposite end cap 70. In this embodiment of the present invention no bottom cap is provided, instead tension from a fishing line attached to the lure retains the lure in a position against end cap 70, thereby preventing contact with the hooks depending from the fishing lure. When a user wishes to utilize the fishing lure, the lure may be grasped and pulled through aperture 76 to a point where the fishing line may be withdrawn through fishing line 74.

FIG. 8 illustrates an embodiment of the present invention utilizing an end cap 80, sidewall 82, and aperture cap 84. Aperture cap 84 is resistance fitted into an aperture formed in the end opposite end cap 80 and may be removed for cleaning debris from within the protective case.

To provide for access to the chamber formed within the protective case, a sliding door 86 is provided. Sliding door 86 slides along tracks formed within end cap 80 and aperture cap 84. A fishing line opening 88 permits a fishing lure to remain attached to the fishing line while enclosed within the protective case.

According to one aspect of the present invention a protective case such as the protective case illustrated in FIG. 8, is provided with means for attaching the protective case to fishing equipment. By way of example and not limitation, the means for attaching the protective case to fishing equipment in the embodiment illustrated in FIG. 8 comprise hinged clamp 90. Hinged clamp 90 allows the protective case to be attached to a fishing rod by manipulating the clamp to apply tension to a spring 92 to open hinge clamp 90. When opened, hinge clamp 90 may be slipped around a fishing rod and released, thereby gripping the fishing rod and attaching the protective case to the rod. A foam insert 94 provides an adhesive surface so that hinge clamp 90 may grip a fishing rod firmly.

FIG. 9 illustrates an embodiment of the present invention utilizing a second protective case attached to the first protective case. This second protective case is provided so that a user may store a second lure or hook within the protective case for use at a later time. The lure or hook stored in the second protective case is not attached to the fishing line while stored within the second protective case.

Second protective case 100 may be adhered to a first protective case or may be molded as part of the first protective case. Second protective case 100 is comprised of an outer housing 102 and an inner housing 104 similar to those described in connection with other embodiments herein. In the embodiment illustrated in FIG. 9, however, inner housing 104 is glued to the aperture cap and grip ring of the first protective case, and work concurrently therewith second protective case 100 differs from outer housing 12 in that no end cap is utilized with second protective case 100 thereby allowing direct adhesion of inner housing 104 to the aperture cap and grip ring 46 of outer housing 12.

To access the chamber formed within the second protective case, a user rotates a second grip ring 106 attached to inner housing 104. Rotation of inner housing 104 within outer housing 102 allows alignment of a second outer housing access aperture 24 and a second inner housing access aperture 44. Upon alignment of the two access apertures, a second fishing lure may be inserted into the chamber formed within the inner housing, and may be stored therein.

With second protective case 100 attached to the first protective case, access to holding chamber 40 within the first protective case is made by rotating either grip ring 46 or outer housing 102 as both are connected. As long as second grip ring 106 is not grasped by a user when twisting outer housing 102, no relative rotation between inner housing 104 and outer housing 102 will occur in the second protective case.

Figure 10:
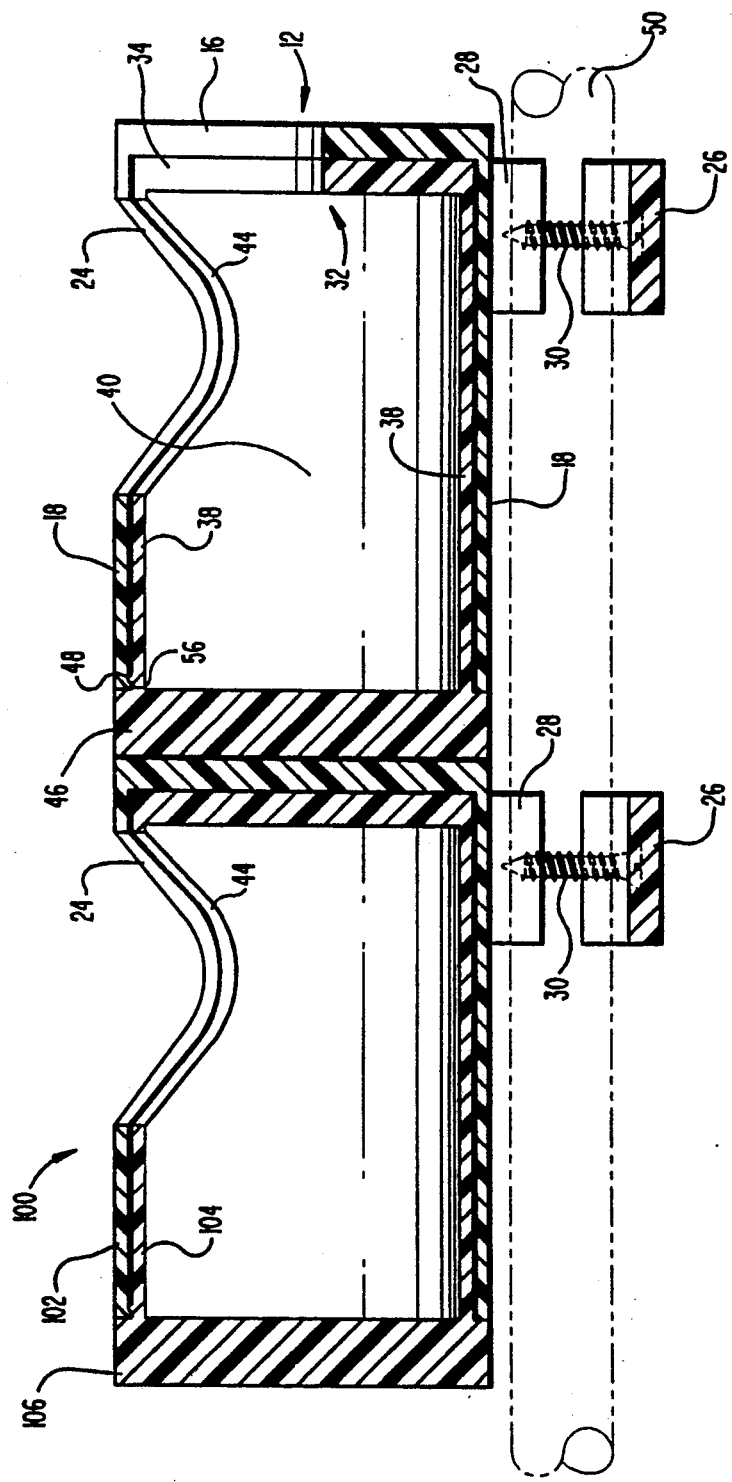
FIG. 10 is a longitudinal cross section of the embodiment of the present invention illustrated in FIG. 9 further depicting the interaction between the elements of that embodiment.

FIG. 10 is a longitudinal cross section taken along lines 10—10 in FIG. 9, further illustrating the inter-relationship of the first protective case with the second protective case. As can be seen, the two cases are joined at grip ring 46. Second protective case 100 is also provided with a detent and retention track similar to those used in the first protective case.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All devices which come within the meaning and range of equivalency of the claims are to be embraced within their scope.

What is claimed and desired to be secured by United States Patent is:

1. A protective case for transporting a fishing hook that is attached to a fishing line connected to a fishing rod, the protective case comprising:
   (a) an outer housing having formed therein a receiving chamber, the outer housing comprising:
      (i) a partially closed outer housing end having fishing line opening formed therein capable of receiving a fishing line therethrough;
      (ii) an outer housing sidewall contiguous with the partially closed outer housing end, the sidewall extending from the partially closed outer housing end to a point wherein the receiving chamber formed therebetween is of sufficient volumetric capacity to contain a fishing hook;
      (iii) an outer housing access port formed in the sidewall capable of receiving the fishing hook; and
      (iv) a receiving orifice formed within the sidewall;
   (b) an inner housing capable of being inserted into the receiving chamber of the outer housing through the receiving orifice, the inner housing having formed therein a holding chamber, the inner housing comprising:
      (i) a partially closed inner housing end having an opening formed therein capable of receiving a fishing line therethrough;
      (ii) an inner housing sidewall contiguous with the partially closed end, the inner housing sidewall extending from the partially closed inner housing end to a point wherein the holding chamber formed therebetween is of sufficient volumetric capacity to contain the fishing hook;
      (iii) an inner housing access port formed in the inner housing sidewall capable of receiving the fishing hook; and
      (iv) an inner housing access aperture formed within an end opposite the partially closed inner housing.

2. A protective case for transporting a fishing hook as recited in claim 1, wherein the inner housing access aperture is closeable with an aperture cap.

3. A protective case for transporting a fishing hook as recited in claim 1, wherein the case further comprises means for attaching the case to fishing equipment.

4. A protective case for transporting a fishing hook as recited in claim 3, wherein the means for attaching the case to fishing equipment comprise a hook and pile fastener connected to the protective case for attachment to a fishing rod.

5. A protective case for transporting a fishing hook as recited in claim 3, wherein the means for attaching the case to fishing equipment comprise a V-shaped appendage formed with the outer housing and a V-shaped clamping member capable of being fastened to the V-shaped appendage to clamp a fishing rod therebetween.

6. A protective case for transporting a fishing hook as recited in claim 3, wherein the means for attaching the case to fishing equipment comprise a spring clamp attached to the protective case capable of gripping a fishing rod to retain the protective case thereagainst.

7. A protective case for transporting a fishing hook as recited in claim 1, wherein the case further comprises means for selectively retaining the inner housing within the outer housing.

8. A protective case for transporting a fishing hook as recited in claim 7, wherein the means for selectively retaining the inner housing within the outer housing comprise a raised detent formed on one of the housings and a receiving ridge formed in the other housing.

9. A protective case for transporting a fishing hook as recited in claim 1, wherein the case further comprises means for transporting an additional fishing hook that is not attached to the fishing line connected to the fishing rod.

* * * * *